United States Patent
Tian et al.

(10) Patent No.: US 12,289,762 B2
(45) Date of Patent: Apr. 29, 2025

(54) NARROWBAND COMMUNICATION FOR ULTRA-WIDEBAND COMMUNICATION

(71) Applicant: QUALCOMM Incorporated, San Diego, CA (US)

(72) Inventors: Bin Tian, San Diego, CA (US); Pooria Pakrooh, San Diego, CA (US); Le Nguyen Luong, San Diego, CA (US); Koorosh Akhavan, San Diego, CA (US); Youhan Kim, Saratoga, CA (US); Maarten Menzo Wentink, Nijmegen (NL); Tevfik Yucek, San Jose, CA (US); Olaf Josef Hirsch, Sunnyvale, CA (US); Didier Johannes Richard Van Nee, Tull en 't Waal (NL); Vincent Knowles Jones, Redwood City, CA (US)

(73) Assignee: QUALCOMM Incorporated, San Diego, CA (US)

( * ) Notice: Subject to any disclaimer, the term of this patent is extended or adjusted under 35 U.S.C. 154(b) by 475 days.

(21) Appl. No.: 17/808,721

(22) Filed: Jun. 24, 2022

(65) Prior Publication Data
US 2023/0328783 A1  Oct. 12, 2023

Related U.S. Application Data

(60) Provisional application No. 63/362,656, filed on Apr. 7, 2022.

(51) Int. Cl.
*H04W 74/08*  (2024.01)
*H04W 4/80*  (2018.01)
(Continued)

(52) U.S. Cl.
CPC ......... *H04W 74/0816* (2013.01); *H04W 4/80* (2018.02); *H04W 56/001* (2013.01); *H04W 72/1263* (2013.01); *H04W 74/0866* (2013.01)

(58) Field of Classification Search
CPC . H04W 74/0816; H04W 4/80; H04W 56/001; H04W 72/1263; H04W 74/0866; H04W 74/0808
See application file for complete search history.

(56) References Cited

U.S. PATENT DOCUMENTS

2023/0171729 A1* 6/2023 Oh .................. H04W 64/003
455/456.1

FOREIGN PATENT DOCUMENTS

WO    WO-02052740 A1    7/2002

OTHER PUBLICATIONS

Ekrem E., et al., "More on Narrowband Assisted Multi-Millisecond UWB", IEEE Draft, 15-21-0593-01-04AB-MORE-ON-NBA-MMS, IEEE-SA Mentor, Piscataway, NJ, USA, vol. 802.15.4ab, No. 1, Nov. 12, 2021, pp. 1-9, XP068198074, Slides 3-4.
(Continued)

*Primary Examiner* — Hashim S Bhatti
(74) *Attorney, Agent, or Firm* — Harrity & Harrity, LLP

(57) ABSTRACT

Various aspects of the present disclosure generally relate to wireless communication. In some aspects, a wireless device may perform a listen-before-talk (LBT) procedure for a narrowband communication that provides time and frequency synchronization and/or scheduling information for an ultra-wideband (UWB) communication. The wireless device may transmit the narrowband communication in response to the LBT procedure being successful. The wireless device may transmit the UWB communication based at
(Continued)

least in part on the time and frequency synchronization and/or scheduling information. Numerous other aspects are described.

30 Claims, 8 Drawing Sheets

(51) Int. Cl.
    *H04W 56/00*     (2009.01)
    *H04W 72/1263*     (2023.01)
    *H04W 74/0816*     (2024.01)

(56) References Cited

OTHER PUBLICATIONS

Huawei et al., "Discussion on Mapping between LCH and CG Configurations", R2-1914782, 3rd Generation Partnership Project (3GPP), Mobile Competence Centre, 650, Route Des Lucioles, F-06921 Sophia-Antipolis Cedex, France, vol. RAN WG2, No. Reno, USA, Nov. 18, 2019-Nov. 22, 2019, 5 Pages, Nov. 7, 2019, XP051815754, p. 3-p. 4.

International Search Report and Written Opinion—PCT/US2023/064118—ISA/EPO—Jun. 16, 2023.

LG Electronics: "Consideration of Coexistence in Co-Channel Among Inter-Operators in Unlicensed Spectrum", 3GPP TSG RAN WG4 Meeting #74, R4-150508_Consideration of Coexistence Analysis in Co-channel Among Inter-operators_REV1, 3rd Generation Partnership Project (3GPP), Mobile Competence Centre, 650, Route Des Lucioles, France, vol. RAN WG4, No. Athens, Greece, Feb. 9, 2015-Feb. 13, 2015, 5 p. Feb. 8, 2015, XP050937973, Section 3, Figure 1.

ZTE: "Discussion on RRM Measurement and DRS Design for LAA", 3GPP TSG RAN WG1 Meeting #80bis R1-151806 Discussion on RRM Measurement and DRS Design for LAA, 3rd Generation Partnership Project (3GPP), Mobile Competence Centre, 650, Route Des Lucioles, F-06921 Sophia-Antipolis Cedex, France, vol. RAN WG1, No. Belgrade, Serbia, Apr. 20, 2015-Apr. 24, 2015, 5Pages, Apr. 11, 2015, XP050950171, Section 3.1.

\* cited by examiner

NARROWBAND COMMUNICATION FOR ULTRA-WIDEBAND COMMUNICATION

CROSS-REFERENCE TO RELATED APPLICATION

This patent application claims priority to U.S. Provisional Patent Application No. 63/362,656, filed on Apr. 7, 2022, entitled "NARROWBAND COMMUNICATION FOR ULTRA-WIDEBAND COMMUNICATION," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for transmitting narrowband communications for ultra-wideband communications.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP). Other technologies may include ultra-wideband (UWB) technologies.

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a wireless device. The method may include performing a listen-before-talk (LBT) procedure for a narrowband communication that provides one or more of time and frequency synchronization or scheduling information for an ultra-wideband (UWB) communication. The method may include transmitting the narrowband communication in response to the LBT procedure being successful. The method may include transmitting the UWB communication based at least in part on the one or more of time and frequency synchronization or scheduling information.

Some aspects described herein relate to a method of wireless communication performed by a wireless device. The method may include selecting a channel from a list of channels for a narrowband communication that provides one or more of time and frequency synchronization or scheduling information for a UWB communication. The method may include transmitting the narrowband communication on the channel. The method may include transmitting the UWB communication based at least in part on the one or more of time and frequency synchronization or scheduling information.

Some aspects described herein relate to a method of wireless communication performed by a wireless device. The method may include selecting a transmission occasion for a narrowband communication that provides one or more of time and frequency synchronization or scheduling information for a UWB communication, where the transmission occasion is specified and based at least in part on a duty cycle. The method may include transmitting the narrowband communication during the transmission occasion. The method may include transmitting the UWB communication based at least in part on the one or more of time and frequency synchronization or scheduling information.

Some aspects described herein relate to a wireless device for wireless communication. The wireless device may include a memory and one or more processors coupled to the memory. The one or more processors may be configured to perform an LBT procedure for a narrowband communication that provides one or more of time and frequency synchronization or scheduling information for a UWB communication. The one or more processors may be configured to transmit the narrowband communication in response to the LBT procedure being successful. The one or more processors may be configured to transmit the UWB communication based at least in part on the one or more of time and frequency synchronization or scheduling information.

Some aspects described herein relate to a wireless device for wireless communication. The wireless device may include a memory and one or more processors coupled to the memory. The one or more processors may be configured to select a channel from a list of channels for a narrowband communication that provides one or more of time and frequency synchronization or scheduling information for a UWB communication. The one or more processors may be configured to transmit the narrowband communication on the channel. The one or more processors may be configured to transmit the UWB communication based at least in part on the one or more of time and frequency synchronization or scheduling information.

Some aspects described herein relate to a wireless device for wireless communication. The wireless device may include a memory and one or more processors coupled to the memory. The one or more processors may be configured to select a transmission occasion for a narrowband communication that provides one or more of time and frequency synchronization or scheduling information for a UWB communication, where the transmission occasion is specified and based at least in part on a duty cycle. The one or more processors may be configured to transmit the narrowband communication during the transmission occasion. The one or more processors may be configured to transmit the UWB communication based at least in part on the one or more of time and frequency synchronization or scheduling information.

Some aspects described herein relate to a non-transitory computer-readable medium that stores a set of instructions for wireless communication by a wireless device. The set of instructions, when executed by one or more processors of the wireless device, may cause the wireless device to perform an LBT procedure for a narrowband communication that provides one or more of time and frequency synchronization or scheduling information for a UWB communication. The set of instructions, when executed by one or more processors of the wireless device, may cause the wireless device to transmit the narrowband communication in response to the LBT procedure being successful. The set of instructions, when executed by one or more processors of the wireless device, may cause the wireless device to transmit the UWB communication based at least in part on the one or more of time and frequency synchronization or scheduling information.

Some aspects described herein relate to a non-transitory computer-readable medium that stores a set of instructions for wireless communication by a wireless device. The set of instructions, when executed by one or more processors of the wireless device, may cause the wireless device to select a channel from a list of channels for a narrowband communication that provides one or more of time and frequency synchronization or scheduling information for a UWB communication. The set of instructions, when executed by one or more processors of the wireless device, may cause the wireless device to transmit the narrowband communication on the channel. The set of instructions, when executed by one or more processors of the wireless device, may cause the wireless device to transmit the UWB communication based at least in part on the one or more of time and frequency synchronization or scheduling information.

Some aspects described herein relate to a non-transitory computer-readable medium that stores a set of instructions for wireless communication by a wireless device. The set of instructions, when executed by one or more processors of the wireless device, may cause the wireless device to select a transmission occasion for a narrowband communication that provides one or more of time and frequency synchronization or scheduling information for a UWB communication, where the transmission occasion is specified and based at least in part on a duty cycle. The set of instructions, when executed by one or more processors of the wireless device, may cause the wireless device to transmit the narrowband communication during the transmission occasion. The set of instructions, when executed by one or more processors of the wireless device, may cause the wireless device to transmit the UWB communication based at least in part on the one or more of time and frequency synchronization or scheduling information.

Some aspects described herein relate to an apparatus for wireless communication. The apparatus may include means for performing an LBT procedure for a narrowband communication that provides one or more of time and frequency synchronization or scheduling information for a UWB communication. The apparatus may include means for transmitting the narrowband communication in response to the LBT procedure being successful. The apparatus may include means for transmitting the UWB communication based at least in part on the one or more of time and frequency synchronization or scheduling information.

Some aspects described herein relate to an apparatus for wireless communication. The apparatus may include means for selecting a channel from a list of channels for a narrowband communication that provides one or more of time and frequency synchronization or scheduling information for a UWB communication. The apparatus may include means for transmitting the narrowband communication on the channel. The apparatus may include means for transmitting the UWB communication based at least in part on the one or more of time and frequency synchronization or scheduling information.

Some aspects described herein relate to an apparatus for wireless communication. The apparatus may include means for selecting a transmission occasion for a narrowband communication that provides one or more of time and frequency synchronization or scheduling information for a UWB communication, where the transmission occasion is specified and based at least in part on a duty cycle. The apparatus may include means for transmitting the narrowband communication during the transmission occasion. The apparatus may include means for transmitting the UWB communication based at least in part on the one or more of time and frequency synchronization or scheduling information.

Aspects generally include a method, apparatus, system, computer program product, non-transitory computer-readable medium, user equipment, base station, access point, UWB device, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

UWB technology may be used to transmit signals with wide bandwidth (e.g., >500 MHz). Signal energy may be transmitted without interfering with narrowband and carrier wave transmission in the same frequency band. UWB may be used for low-energy, short-range applications, e.g., for ranging. UWB is presently divided into channels 1-15 spanning frequencies from about 3.5 GHz to about 4.5 GHz and from about 6.5 GHz to about 10 GHz.

Figure 1:
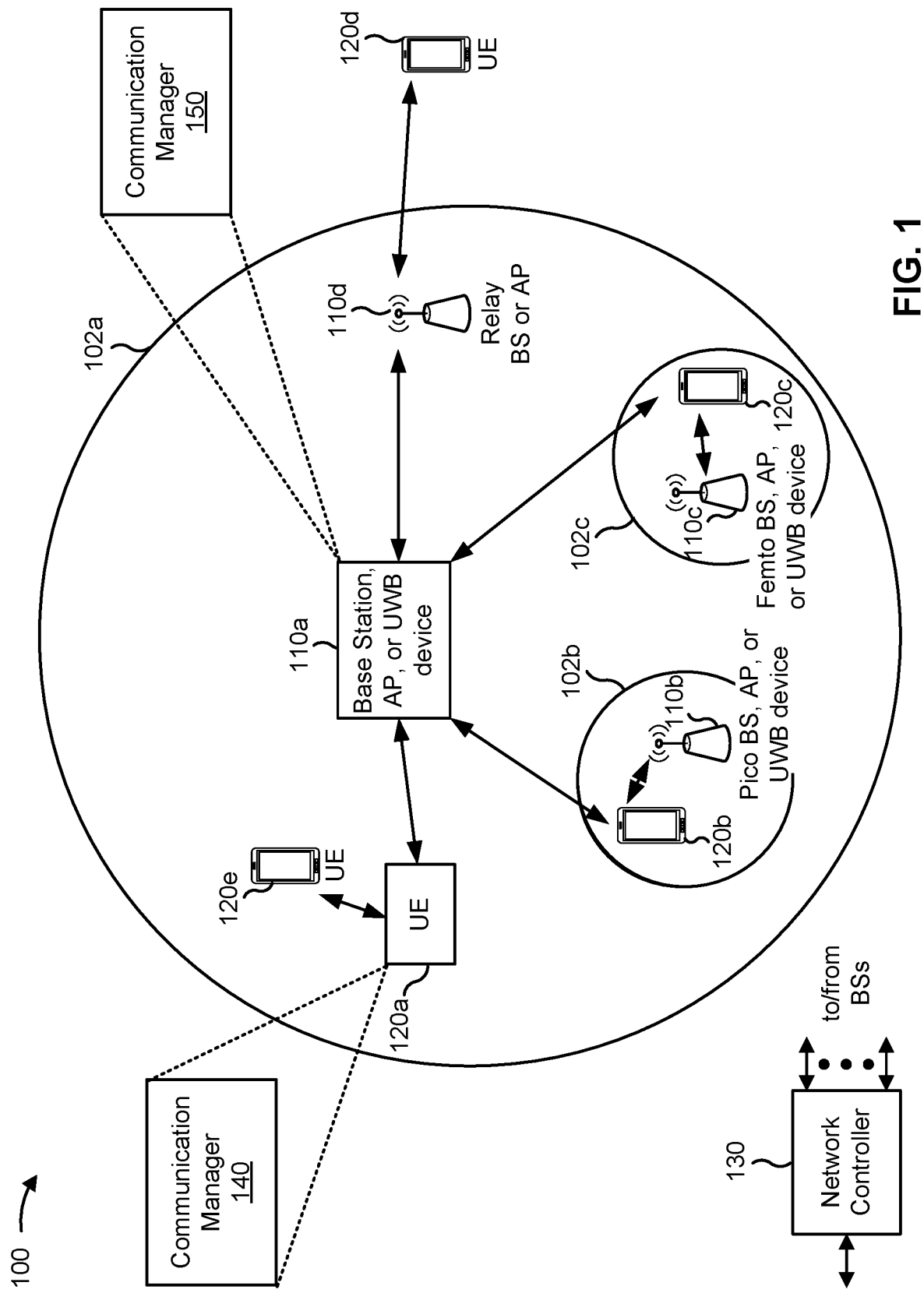
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network, a 4G (e.g., Long Term Evolution (LTE)) network, wide area network (WAN) access points (APs), personal area network (PAN) access points and devices, or UWB devices (e.g., UWB anchor, UWB tag), among other examples. The wireless network 100 may include one or more network entities, such as a base station, AP, or UWB device 110 (shown as BS, AP, or UWB device 110a, pico BS, AP, or UWB device 110b, femto BS, AP, or UWB device 110c, and a relay BS, AP, or UWB device 110d). The wireless network 100 may also include a user equipment (UE) 120 or multiple UEs 120 (shown as a UE 120a, a UE 120b, a UE 120c, a UE 120d, and a UE 120e). A base station, AP, or UWB device 110 is a network entity that communicates with UEs 120. A base station (sometimes referred to as a BS) may include, for example, an NR base station, an LTE base station, a Node B, an eNB (e.g., in 4G), a gNB (e.g., in 5G), and/or a transmission reception point (TRP). Each base station, AP, or UWB device 110 may provide communication coverage for a particular geographic area. In the Third Generation Partnership Project (3GPP), the term "cell" can refer to a coverage area of a base station, AP, or UWB device 110 and/or a base station subsystem serving this coverage area, depending on the context in which the term is used.

In some aspects, the term "base station" or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (MC), or a Non-Real Time (Non-RT) RIC, or a combination thereof. In some aspects, the term "base station" or "network entity" may refer to one device configured to perform one or more functions, such as those described herein in connection with the base station. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station. A WAN access point, a PAN access point, a UWB device (e.g., UWB anchor, UWB tag, or other form of a UWB-capable device), and a UWB access point may also be referred to as a "network entity." A network entity may include components described for the base station, AP, or UWB device 110.

A base station, AP, or UWB device 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station for a macro cell may be referred to as a macro base station. A base station for a pico cell may be referred to as a pico base station. A base station for a femto cell may be referred to as a femto base station or an in-home base station. In the example shown in FIG. 1, the BS, AP, or UWB device 110a may be a macro base station, AP, or UWB device for a macro cell 102a, the BS, AP, or UWB device 110b may be a pico base station, AP, or UWB device for a pico cell 102b, and the BS, AP, or UWB device 110c may be a femto base station, AP, or UWB device for a femto cell 102c. A base station may support one or multiple (e.g., three) cells. A network entity may be a macro base station, a pico base station, or a femto base station.

In some examples, a cell may not necessarily be stationary, and the geographic area of the cell may move according to the location of a base station that is mobile (e.g., a mobile base station). In some examples, the base stations, APs, or UWB devices 110 may be interconnected to one another and/or to one or more other base stations, Aps, or UWB devices 110 or network entities (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a network entity or a UE 120) and send a transmission of the data to a downstream station (e.g., a UE 120 or a network entity). A relay station may be a UE 120 that can relay transmissions for other UEs 120. In the example shown in FIG. 1, the BS, AP, or UWB device 110d (e.g., a relay base station) may communicate with the BS, AP, or UWB device 110a (e.g., a macro base station, AP, UWB device) and the UE 120d in order to facilitate communication between the BS, AP, or UWB device 110a and the UE 120d. A base station that relays communications may be referred to as a relay station, a relay base station, a relay, or the like.

The wireless network 100 may be a heterogeneous network that includes base stations of different types, such as macro base stations, pico base stations, femto base stations, relay base stations, or the like. These different types of base stations, different types of APs, or different types of UWB devices may have different transmit power levels, different coverage areas, and/or different impacts on interference in the wireless network 100. For example, macro base stations, APs, or UWB devices may have a high transmit power level (e.g., 5 to 40 watts) whereas pico base stations, APs, or UWB devices, femto base stations, APs, or UWB devices, and relay base stations, APs, or UWB devices may have lower transmit power levels (e.g., 0.1 to 2 watts).

A network controller 130 may couple to or communicate with a set of network entities and may provide coordination and control for these network entities. The network controller 130 may communicate with the network entities via a backhaul communication link. The network entities may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium. A UE 120 may be capable of UWB communications.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed. In some cases, WANs, PANs, or UWB networks may be deployed.

In some examples, two or more UEs 120 (e.g., shown as UE 120a and UE 120e) may communicate directly using one or more sidelink channels (e.g., without using a network entity as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station, AP, or UWB device 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. A UWB frequency bandwidth may be greater than 500 MHz. UWB is presently divided into channels 1-15 spanning frequencies from about 3.5 GHz to about 4.5 GHz and from about 6.5 GHz to about 10 GHz. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a wireless device (e.g., a UE 120) may include a communication manager 140 or 150. As described in more detail elsewhere herein, the communication manager 140 or 150 may perform a listen-before-talk (LBT) procedure for a narrowband communication that provides time/frequency synchronization and/or scheduling information for ultra-wideband (UWB) communication. The communication manager 140 or 150 may transmit the narrowband communication in response to the LBT procedure being successful and transmit the UWB communication based at least in part on the time/frequency synchronization and/or scheduling information.

In some aspects, the communication manager 140 or 150 may select a channel from a list of channels for a narrowband communication that provides time/frequency synchronization and/or scheduling information for a UWB communication. The communication manager 140 or 150 may transmit the narrowband communication on the channel and transmit the UWB communication based at least in part on the time/frequency synchronization and/or scheduling information.

In some aspects, the communication manager 140 or 150 may select a transmission occasion for a narrowband communication that provides time/frequency synchronization and/or scheduling information for a UWB communication, where the transmission occasion is specified and based at least in part on a duty cycle. The communication manager 140 or 150 may transmit the narrowband communication during the transmission occasion and transmit the UWB communication based at least in part on the time/frequency synchronization and/or scheduling information. Additionally, or alternatively, the communication manager 140 or 150 may perform one or more other operations described herein.

As indicated above, FIG. 1 is provided as an example. Other examples may differ from what is described with regard to FIG. 1.

Figure 2:
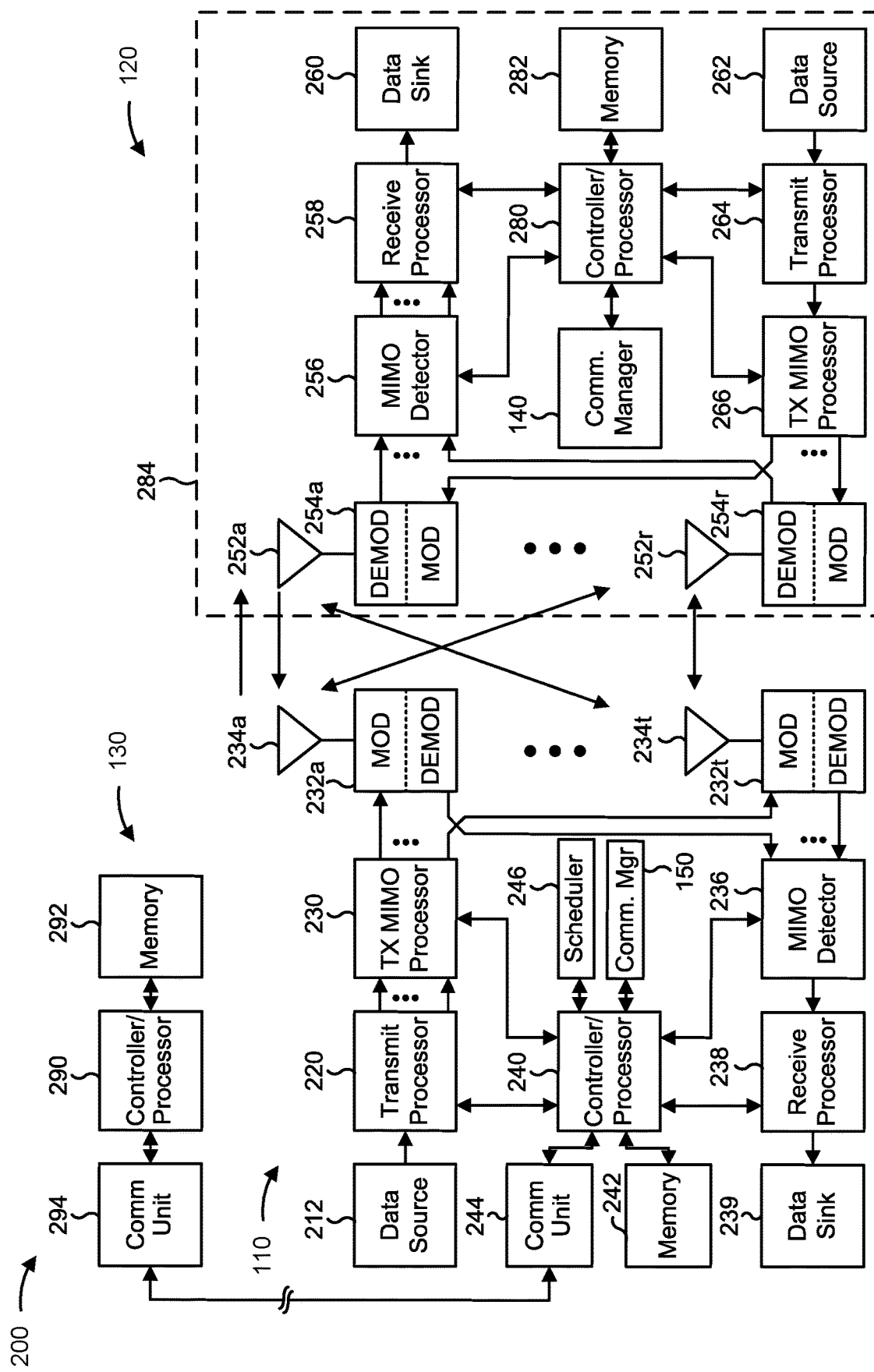
FIG. 2 is a diagram illustrating an example of a base station in communication with a user equipment (UE) in a wireless network, in accordance with the present disclosure.

FIG. 2 is a diagram illustrating an example 200 of a network entity (e.g., base station, AP, or UWB device 110) in communication with a UE 120 in a wireless network 100, in accordance with the present disclosure. The base station, AP, or UWB device 110 may be equipped with a set of antennas 234a through 234t, such as T antennas (T≥1). The UE 120 may be equipped with a set of antennas 252a through 252r, such as R antennas (R≥1). A WAN access point may also include components as described for the base station, AP, or UWB device 110 and may also operate in accordance with Institute of Electrical Engineers (IEEE) standards (e.g., IEEE 802).

At the base station, AP, or UWB device 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station, AP, or UWB device 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station AP, or UWB device 110 and/or other base stations, Aps, or UWB devices 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network entity via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network entity. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-8).

At the network entity (e.g., base station, AP, or UWB device 110), the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network entity may include a communication unit 244 and may communicate with the network controller 130 via the communication unit 244. The network entity may include a scheduler 246 to schedule one or more UEs 120 for downlink and/or uplink communications. In some examples, the modem 232 of the network entity may include a modulator and a demodulator. In some examples, the network entity includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-8).

A controller/processor of a network entity (e.g., the controller/processor 240 of the base station, AP, or UWB device 110), the controller/processor 280 of the UE 120, and/or any other component(s) of FIG. 2 may perform one or more techniques associated with transmitting a narrowband communication for a UWB communication, as described in more detail elsewhere herein. In some aspects, the wireless device or UWB device described herein is the UE 120, is included in the UE 120, or includes one or more components of the UE 120 shown in FIG. 2. In some aspects, the wireless device or UWB device described herein is the base station, AP, or UWB device 110, is included in the base station, AP, or UWB device 110, or includes one or more components of the base station, AP, or UWB device 110 shown in FIG. 2. For example, the controller/processor 240 of the base station, AP, or UWB device 110, the controller/processor 280 of the UE 120, and/or any other component(s) of FIG. 2 may perform or direct operations of, for example, process 500 of FIG. 5, process 600 of FIG. 6, process 700 of FIG. 7, and/or other processes as described herein. The memory 242 and the memory 282 may store data and program codes for the network entity and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network entity and/or the UE 120, may cause the one or more processors, the UE 120, and/or the network entity to perform or direct operations of, for example, process 500 of FIG. 5, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, a wireless device (e.g., a UE 120) includes means for performing an LBT procedure for a narrowband communication that provides time and frequency synchronization and/or scheduling information for a UWB communication; means for transmitting the narrowband communication in response to the LBT procedure being successful; and/or means for transmitting the UWB communication based at least in part on the time and frequency synchronization and/or scheduling information. In some aspects, the means for the wireless device to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a wireless device (e.g., a UE 120) includes means for selecting a channel from a list of channels for a narrowband communication that provides time and frequency synchronization and/or scheduling information for a UWB communication; means for transmitting the narrowband communication on the channel; and/or means for transmitting the UWB communication based at least in part on the time and frequency synchronization and/or scheduling information.

In some aspects, a wireless device (e.g., a UE 120) includes means for selecting a transmission occasion for a narrowband communication that provides time and frequency synchronization and/or scheduling information for a UWB communication, where the transmission occasion is specified and based at least in part on a duty cycle; means for transmitting the narrowband communication during the transmission occasion; and/or means for transmitting the UWB communication based at least in part on the time and frequency synchronization and/or scheduling information.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
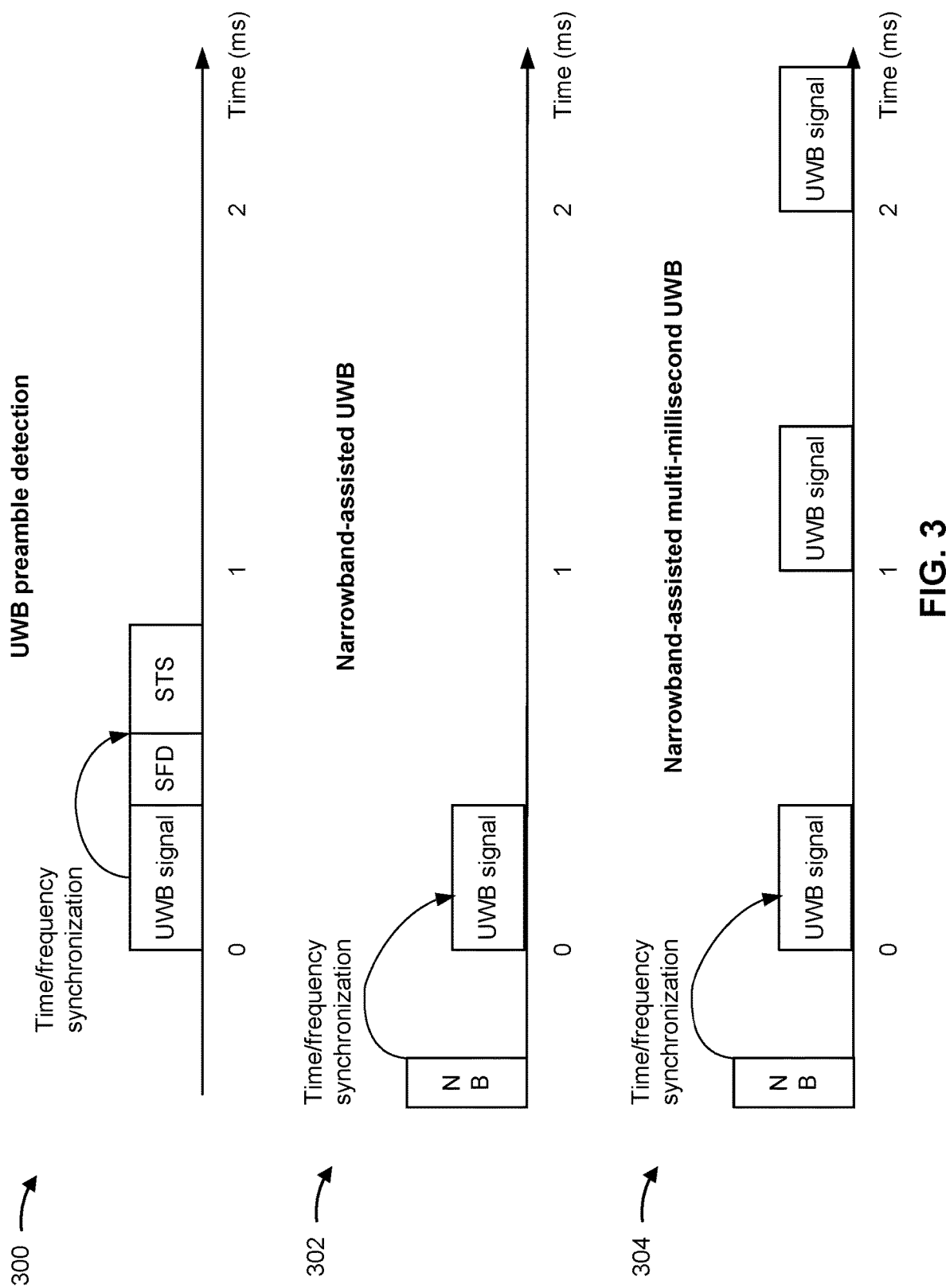
FIG. 3 is a diagram illustrating examples of narrowband assisted ultra-wideband (UWB), in accordance with the present disclosure.

FIG. 3 is a diagram illustrating examples of narrowband assisted UWB, in accordance with the present disclosure.

A UWB device (e.g., a UE 120) may communicate at UWB frequencies, which may be used for low energy, short-range, and high-bandwidth communications. UWB applications may include sensing, ranging, positioning, and personal area networks. Example 300 shows a UWB packet that includes a UWB signal or communication (e.g., UWB preamble signal), a start frame delimiter (SFD), and optionally a secure training sequence (STS) field that provides time/frequency synchronization. A receiving UWB device may monitor for the preamble and/or the STS, but because UWB communications are low energy, the STS may be difficult to detect. The STS may not be decoded due to interference or distance, and the time/frequency synchronization associated with the UWB preamble signal may be lost.

To assist with UWB communications, a UWB device may transmit a narrowband (NB) communication with more power (e.g., 14 decibel milliwatts (dBm)) in a narrower frequency band to extend the range, as shown by example 302. The NB communication may share a clock source with a UWB communication (e.g., UWB preamble). The NB communication may provide initial time/frequency synchronization for the UWB communication, which is transmitted later. In some aspects, as shown by example 304, the NB communication may be associated with multiple UWB signals or communications (e.g., UWB preamble signals). The receiving UWB device, having received the initial timing and frequency information from the NB communication, may skip packet detection and combine UWB preambles received over multiple 1 millisecond (ms) segments. NB communications may be used in a UNII-3 band, a UNIT-5 band, or a UNII-6/7/8 band. NB communications may use, for example, offset quadrature phase-shift keying (O-QPSK) at 250 kilobits per second (kbps) with a bandwidth of 2 MHz. In some aspects, NB communications may use frequency hopping.

UNII-3 band is used by many technologies, including Wi-Fi, and can get crowded. NB communications may collide with ongoing Wi-Fi communications and other NB communications from other devices, causing UWB communication failure. Time sharing may be needed between Wi-Fi communications and NB communications. Furthermore, frequency hopping and arbitrary message arrival times of the NB communications may make arbitration difficult.

As indicated above, FIG. 3 is provided as an example. Other examples may differ from what is described with regard to FIG. 3.

Figure 4:
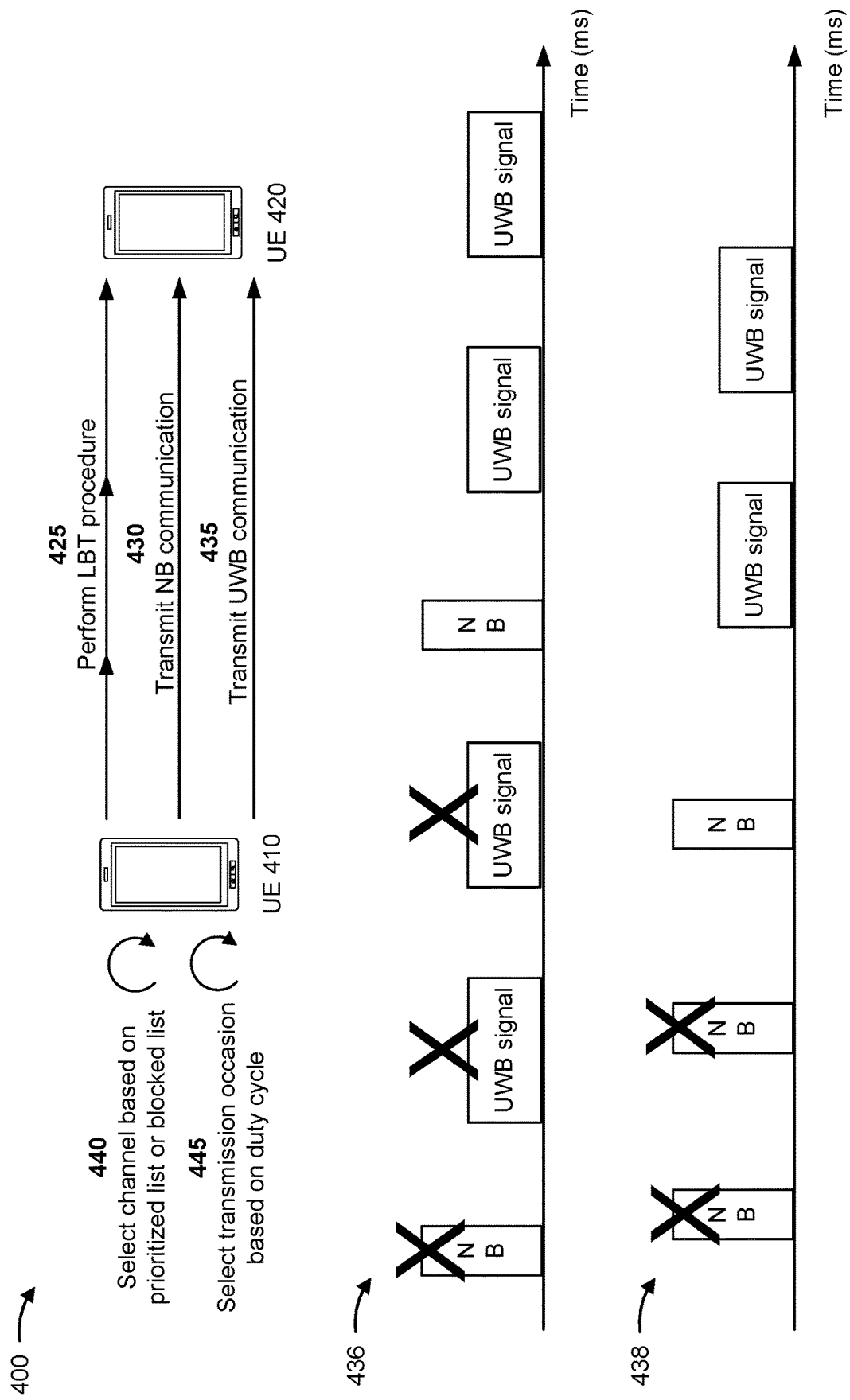
FIG. 4 is a diagram illustrating an example of techniques to improve narrowband communications for UWB communications, in accordance with the present disclosure.

FIG. 4 is a diagram illustrating an example 400 of techniques to improve NB communications for UWB communications, in accordance with the present disclosure. Example 400 shows a first UWB device (e.g., UE 410) and a second UWB device (e.g., UE 420) that may communicate with each other directly or using a wireless network such as wireless network 100.

According to various aspects described herein, NB communications may involve techniques to improve UWB communications while coexisting with other devices in a UWB frequency band. For example, a UWB device may perform an LBT procedure before transmitting an NB communication. The UWB device may frequency hop among prioritized channels and avoid blocked channels. The UWB device may also select transmission occasions based at least in part on a duty cycle.

Example 400 shows some of these techniques. As shown by reference number 425, UE 410 may perform an LBT procedure to detect an energy level (e.g., at an LBT threshold of at least −62 dBm per 20 MHz) on a channel in a UWB bandwidth. The LBT procedure may detect whether the channel is clear for an NB communication. The LBT procedure may have a random back off for retrying LBT or an exponential back off (increasing time durations between LBT attempts) for retrying LBT. However, to reduce power consumption and to reduce the complexity of Wi-Fi and NB arbitration, UE 410 may use frame-based LBT, where transmissions are canceled if the channel is busy until a next fixed time (frame).

If the LBT procedure is successful (energy not detected at or above the LBT threshold), UE 410 may transmit the NB communication, as shown by reference number 430. The NB communication may provide time and/or frequency resource information (scheduling information) and/or (time and frequency) synchronization for one or more UWB signals or communications. The NB communication may provide time/frequency synchronization via information in the NB communication. The NB communication may provide time/frequency synchronization by enabling the UE 410 to obtain time/frequency synchronization based at least in part on the NB communication. Time and frequency synchronization may refer to synchronization of time and/or frequency. As shown by reference number 435, UE 410 may transmit a UWB signal or communication (e.g., UWB preamble) based at least in part on the resource and synchronization information. UE 420, having the resource and synchronization information, may skip detection of the UWB communication and receive the UWB communication.

In some aspects, if the LBT procedure for an NB communication is not successful (energy is detected on the channel at or above the LBT threshold), UE 410 may cancel UWB communications associated with the NB communication, as shown by reference number 436. UE 410 may retry the LBT procedure at a next slot or after a specified interval that includes at least one scheduled NB and a UWB transmission occasion. That is, UE 410 may retry the LBT procedure after enough time passes for transmitting another NB communication.

In some aspects, as shown by reference number 438, multiple LBT procedures may fail for NB communications. If a quantity of unsuccessful LBT procedures for NB communications satisfies a quantity threshold (e.g., maximum quantity of LBT failures for a time period), UE 410 may skip a ranging round. A ranging round may include an interval that includes an NB communication and associated UWB communications. A ranging round may include a time duration or quantity of UWB communications for determining a range (distance) of another object or device. By performing LBT procedures and cancelling NB communications as necessary, collisions may be avoided and successful UWB communications may be improved.

In some aspects, as shown by reference number 440, UE 410 may select a channel from a list of channels for an NB communication. The list may be a prioritized list that prioritizes channels based at least in part on what channels are less-used, most likely to be free, or most likely to avoid collisions with other devices or procedures. The prioritized NB channels may include channels within a part (subset) or all of 5730-5735 MHz (5 MHz), a subset or all of 5725-5730 MHz (part of Wi-Fi channel 144, 5 MHz), a subset or all of 5835-5850 MHz (part of Wi-Fi channel 169, 15 MHz), a subset or all of 5815-5835 MHz (Wi-Fi channel 165, 20 MHz).

In some aspects, LBT procedures may be performed for each selected channel. An LBT energy detection threshold for a channel in the prioritized list may be greater than an LBT energy detection threshold for a channel that is not in the prioritized list. For example, a prioritized channel may be considered clear enough for transmission even if more energy is detected than for a non-prioritized channel. In some aspects, UE 410 may apply a more stringent NB transmission duty cycle requirement for channels not in the prioritized list than compared to channels in the prioritized list. This may include a lower duty cycle for non-prioritized channels.

UE 410 may select the channel from the prioritized channel list as part of frequency hopping. Frequency hopping may ensure more frequency diversity and avoid repeated interference of one Wi-Fi channel (e.g., 80 MHz channel). The frequency hopping may involve a minimum hopping distance (e.g., 80 MHz or 20 MHz frequency separation) between hops.

In some aspects, UE 410 may select the channel (as part of frequency hopping) so as to avoid or skip channels in a blocked channel list. The blocked channel list may include more frequently used channels or channels that have a history of unsuccessful LBT procedures. UE 410 may generate the blocked channel list based at least in part on the history of unsuccessful LBT procedures or on channels that have scanning information (e.g., Wi-Fi channel scanning) or other external information indicating issues with the channels being clear. UE 410 may negotiate blocked channel lists with UE 420 during the exchange of capacity information during the setup of ranging or sensing. Negotiation may include requesting, accepting, rejecting, and/or counterproposing channels to be blocked. Once exchanged, requested blocked channel lists may be respected by both UEs. By selecting channels from a prioritized list and/or skipping channels from a blocked list, collisions may be avoided and successful UWB communications may be improved.

In some aspects, UE 410 may transmit NB communications based at least in part on a duty cycle configured for UE 410. For example, as shown by reference number 445, UE 410 may select a transmission occasion for an NB communication based at least in part on the duty cycle. The transmission occasion may be skipped if an LBT procedure is unsuccessful. UE 410 may negotiate (e.g., request) the transmission occasion or the duty cycle with UE 420. The duty cycle may be selected to control an impact to other coexisting devices and/or technologies. The duty cycle for NB communications may be, for example, 10% or 20% of possible transmission occasions for communications. By limiting the duty cycle for NB transmissions, collisions may be avoided and successful UWB communications may be improved.

As indicated above, FIG. 4 is provided as an example. Other examples may differ from what is described with regard to FIG. 4.

Figure 5:
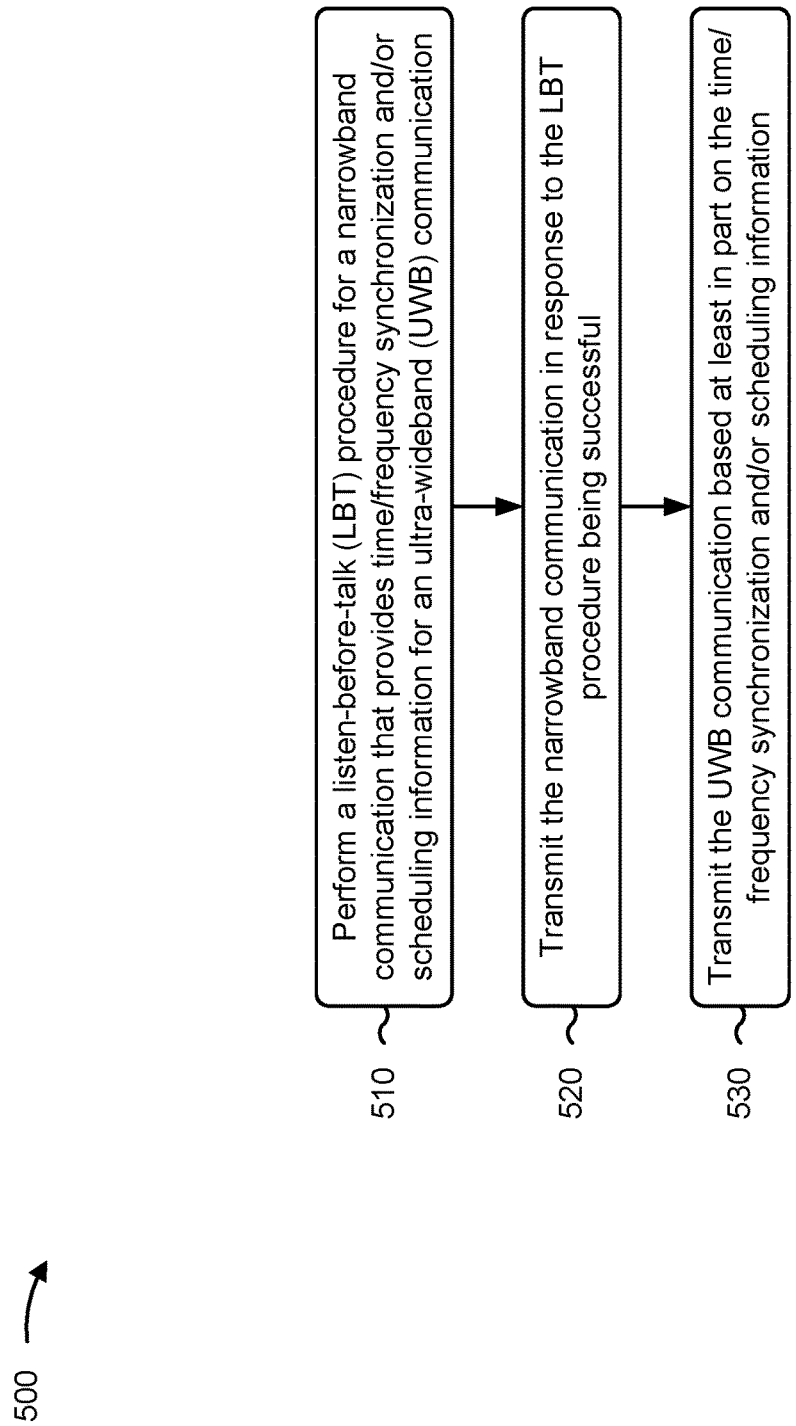
FIG. 5 is a diagram illustrating an example process performed, for example, by a wireless device, in accordance with the present disclosure.

FIG. 5 is a diagram illustrating an example process 500 performed, for example, by a wireless device, in accordance with the present disclosure. Example process 500 is an example where the wireless device (e.g., a UE 120, UE 410, UWB-capable network entity) performs operations associated with transmitting NB communications for UWB communications.

As shown in FIG. 5, in some aspects, process 500 may include performing an LBT procedure for a narrowband communication that provides resource and synchronization information for a UWB communication, or one or more of time and frequency synchronization or scheduling information for a UWB communication (block 510). For example, the wireless device (e.g., using communication manager 808 and/or LBT component 810 depicted in FIG. 8) may perform an LBT procedure for a narrowband communication that provides resource and synchronization information, or one or more of time and frequency synchronization or scheduling information, for a UWB communication, as described above.

As further shown in FIG. 5, in some aspects, process 500 may include transmitting the narrowband communication in response to the LBT procedure being successful (block 520). For example, the wireless device (e.g., using communication manager 808 and/or transmission component 804 depicted in FIG. 8) may transmit the narrowband communication in response to the LBT procedure being successful, as described above.

As further shown in FIG. 5, in some aspects, process 500 may include transmitting the UWB communication based at least in part on the resource and synchronization information, or the time and frequency synchronization and/or scheduling information (block 530). For example, the wireless device (e.g., using communication manager 808 and/or transmission component 804 depicted in FIG. 8) may transmit the UWB communication based at least in part on the resource and synchronization information, or the time and frequency synchronization and/or scheduling information, as described above.

Process 500 may include additional aspects, such as any single aspect or any combination of aspects described below and/or in connection with one or more other processes described elsewhere herein.

In a first aspect, process 500 includes canceling UWB communications that are associated with narrowband communications for which corresponding LBT procedures are unsuccessful due to a channel being busy.

In a second aspect, alone or in combination with the first aspect, process 500 includes retrying the LBT procedure after a specified interval that includes at least one scheduled NB and a UWB transmission occasion.

In a third aspect, alone or in combination with one or more of the first and second aspects, process 500 includes skipping a ranging round in response to a quantity of unsuccessful LBT procedures for narrowband communications that satisfies a quantity threshold. In some aspects, process 500 includes transmitting an NB communication in response to an LBT procedure being successful, scheduling a UWB communication, and transmitting the UWB communication.

In a fourth aspect, alone or in combination with one or more of the first through third aspects, the UWB communication includes a UWB preamble signal.

In a fifth aspect, alone or in combination with one or more of the first through fourth aspects, the LBT procedure uses an energy detection threshold to determine if a channel is busy.

In a sixth aspect, alone or in combination with one or more of the first through fifth aspects, the energy detection threshold is at least −62 dBm per 20 MHz.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
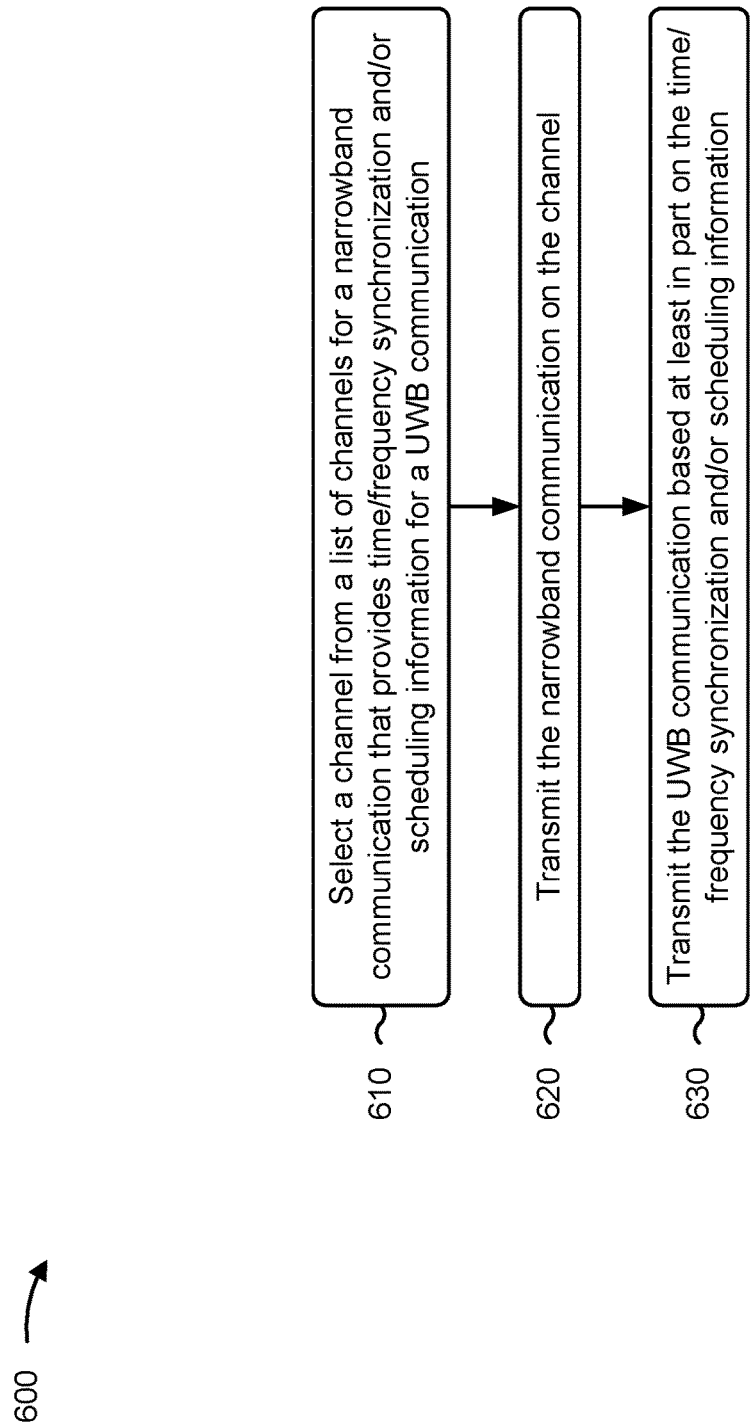
FIG. 6 is a diagram illustrating an example process performed, for example, by a wireless device, in accordance with the present disclosure.

FIG. 6 is a diagram illustrating an example process 600 performed, for example, by a wireless device, in accordance with the present disclosure. Example process 600 is an example where the wireless device (e.g., a UE 120, UE 410, UWB-capable network entity) performs operations associated with transmitting NB communications for UWB communications.

As shown in FIG. 6, in some aspects, process 600 may include selecting a channel from a list of channels for a narrowband communication that provides resource and synchronization information for a UWB communication, or time and frequency synchronization and/or scheduling information for a UWB communication (block 610). For example, the wireless device (e.g., using communication manager 808 and/or selection component 812 depicted in FIG. 8) may select a channel from a list of channels for a narrowband communication that provides resource and synchronization information, or time and frequency synchronization and/or scheduling information, for a UWB communication, as described above.

As further shown in FIG. 6, in some aspects, process 600 may include transmitting the narrowband communication on the channel (block 620). For example, the wireless device (e.g., using communication manager 808 and/or transmission component 804 depicted in FIG. 8) may transmit the narrowband communication on the channel, as described above.

As further shown in FIG. 6, in some aspects, process 600 may include transmitting the UWB communication based at least in part on the resource and synchronization information, or the time and frequency synchronization and/or scheduling information (block 630). For example, the wireless device (e.g., using communication manager 808 and/or transmission component 804 depicted in FIG. 8) may transmit the UWB communication based at least in part on the resource and synchronization information, or the time and frequency synchronization and/or scheduling information, as described above.

Process 600 may include additional aspects, such as any single aspect or any combination of aspects described below and/or in connection with one or more other processes described elsewhere herein.

In a first aspect, selecting the channel includes frequency hopping from channel to channel in the list of channels.

In a second aspect, alone or in combination with the first aspect, frequency hopping includes hopping channels satisfying a minimum hopping distance.

In a third aspect, alone or in combination with one or more of the first and second aspects, the list of channels includes a prioritized list.

In a fourth aspect, alone or in combination with one or more of the first through third aspects, the prioritized list includes at least a subset (a non-empty proper subset or all) of 5730-5735 MHz, at least a subset of 5725-5730 MHz, at least a subset of 5835-5850 MHz, or at least a subset of 5815-5835 MHz.

In a fifth aspect, alone or in combination with one or more of the first through fourth aspects, process 600 includes performing an LBT procedure for channels before transmitting the narrowband communication or the UWB communication.

In a sixth aspect, alone or in combination with one or more of the first through fifth aspects, process 600 includes applying a more stringent NB transmission duty cycle requirement for channels not in the prioritized list than for channels in the prioritized list.

In a seventh aspect, alone or in combination with one or more of the first through sixth aspects, an LBT energy detection threshold for a channel in the prioritized list of channels is greater than an LBT energy detection threshold for a channel that is not in the prioritized list.

In an eighth aspect, alone or in combination with one or more of the first through seventh aspects, the list of channels includes a blocked list, maintained by the wireless device, and selecting the channel includes avoiding channels in the blocked list.

In a ninth aspect, alone or in combination with one or more of the first through eighth aspects, process 600 includes generating the blocked list based at least in part on channel success rates for narrowband transmissions or channel scanning information.

In a tenth aspect, alone or in combination with one or more of the first through ninth aspects, process 600 includes exchanging blocked lists as a capability in a setup procedure and respecting blocked lists with another wireless device. Respecting a blocked list received from another device includes not selecting a channel of the blocked list received from the other device.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
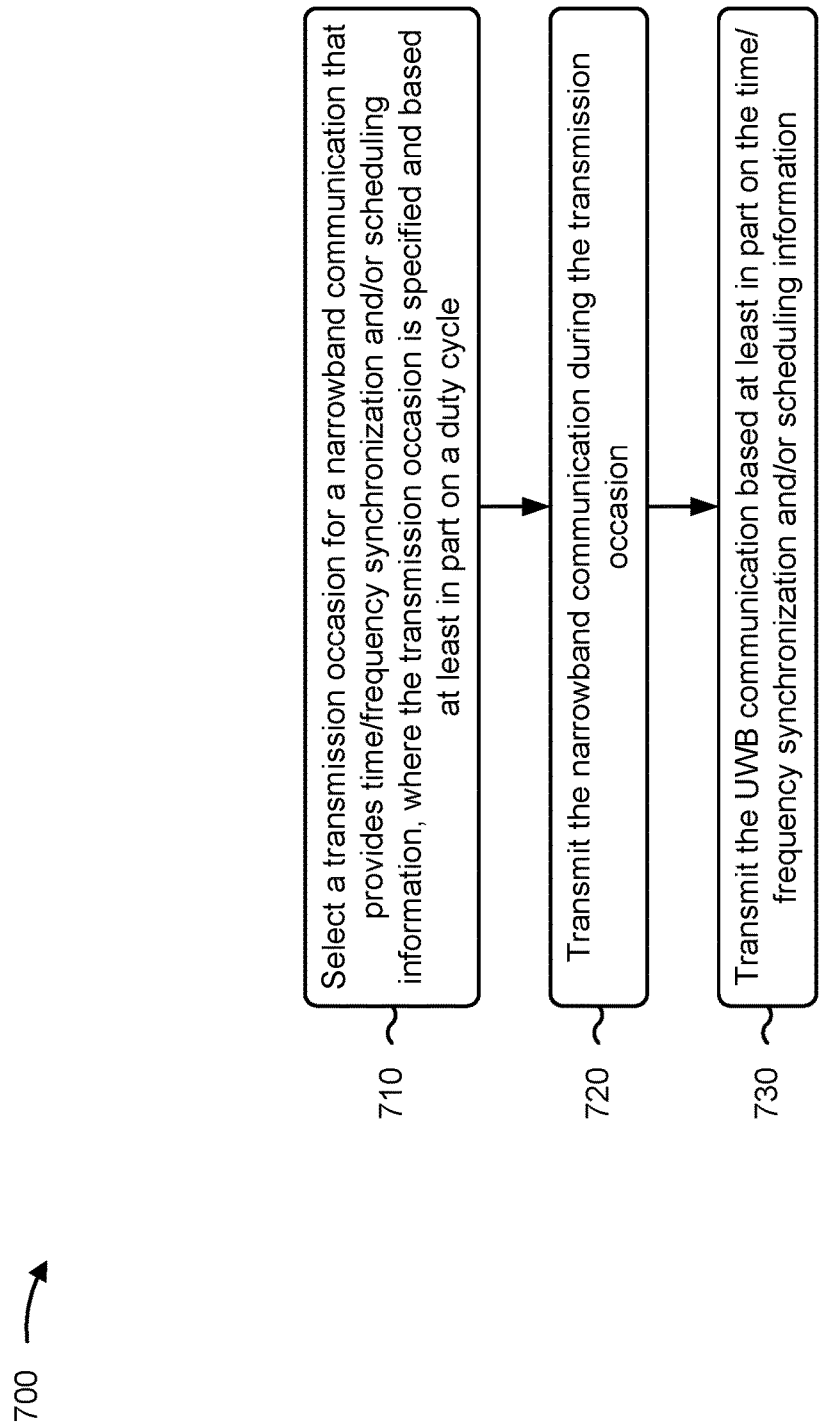
FIG. 7 is a diagram illustrating an example process performed, for example, by a wireless device, in accordance with the present disclosure.

FIG. 7 is a diagram illustrating an example process 700 performed, for example, by a wireless device, in accordance with the present disclosure. Example process 700 is an example where a wireless device (e.g., a UE 120, UE 410, UWB-capable network entity) performs operations associated with transmitting NB communications for UWB communications As shown in FIG. 7, in some aspects, process 700 may include selecting a transmission occasion for a narrowband communication that provides resource and synchronization information for a UWB communication, or time and frequency synchronization and/or scheduling information for a UWB communication, where the transmission occasion is specified and based at least in part on a duty cycle (block 710). For example, the wireless device (e.g., using communication manager 808 and/or selection component 812 depicted in FIG. 8) may select a transmission occasion for a narrowband communication that provides resource and synchronization information, or time and frequency synchronization and/or scheduling information, for a UWB communication, where the transmission occasion is specified and based at least in part on a duty cycle, as described above.

As further shown in FIG. 7, in some aspects, process 700 may include transmitting the narrowband communication during the transmission occasion (block 720). For example, the wireless device (e.g., using communication manager 808 and/or transmission component 804 depicted in FIG. 8) may transmit the narrowband communication during the transmission occasion, as described above.

As further shown in FIG. 7, in some aspects, process 700 may include transmitting the UWB communication based at least in part on the resource and synchronization information, or the time and frequency synchronization and/or scheduling information (block 730). For example, the wireless device (e.g., using communication manager 808 and/or transmission component 804 depicted in FIG. 8) may transmit the UWB communication based at least in part on the resource and synchronization information, or the time and frequency synchronization and/or scheduling information for a UWB communication, as described above.

Process 700 may include additional aspects, such as any single aspect or any combination of aspects described below and/or in connection with one or more other processes described elsewhere herein.

In a first aspect, process 700 includes negotiating one or more of the transmission occasion or the duty cycle.

In a second aspect, alone or in combination with the first aspect, process 700 includes performing an LBT procedure before transmitting the narrowband communication.

In a third aspect, alone or in combination with one or more of the first and second aspects, the duty cycle is based at least in part on coexistence with another device or another RAT.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
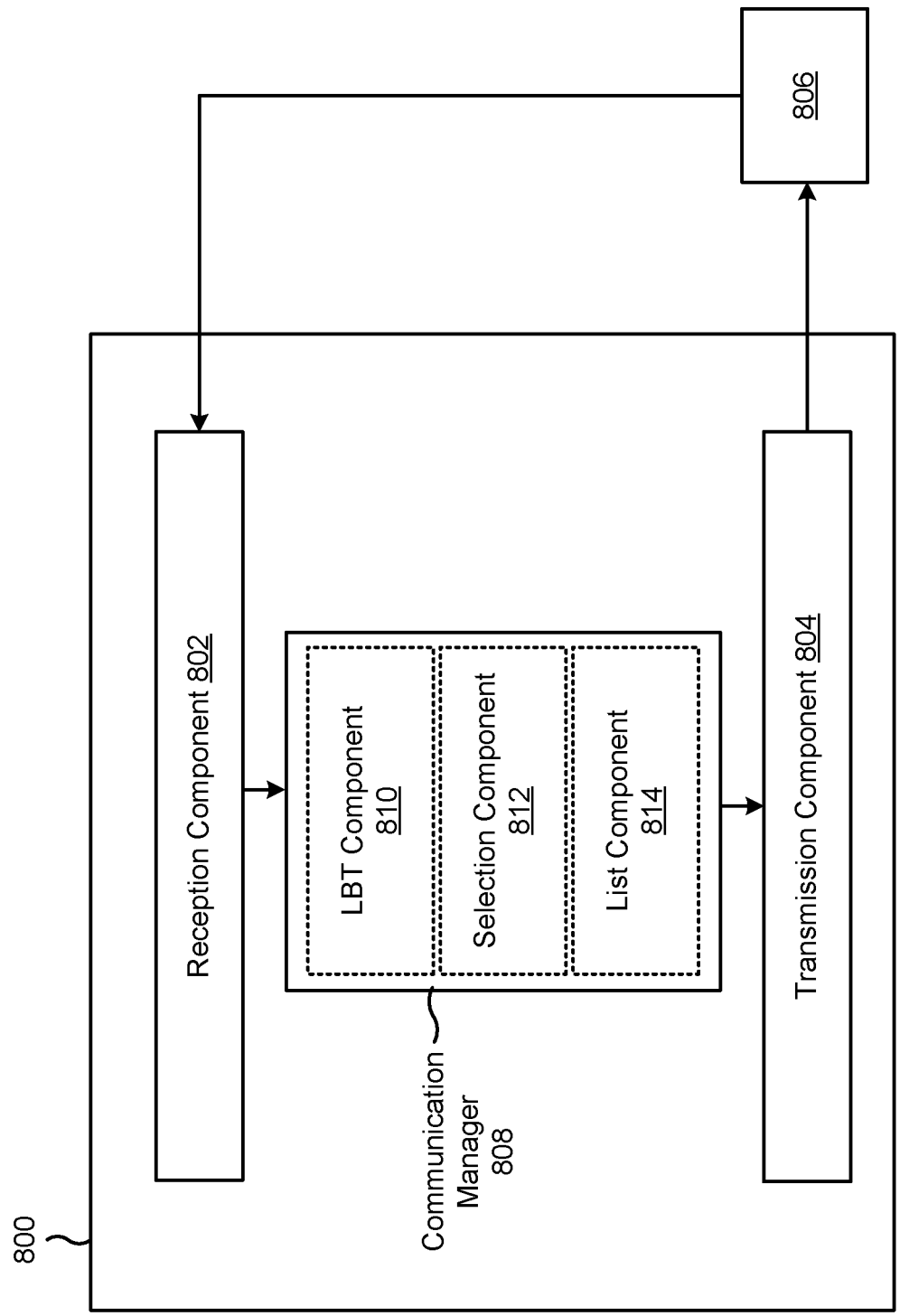
FIG. 8 is a diagram of an example apparatus for wireless communication, in accordance with the present disclosure.

FIG. 8 is a diagram of an example apparatus 800 for wireless communication. The apparatus 800 may be a wireless device (e.g., a UE 120, a UWB device, a UWB-capable network entity, UE 410), or a wireless device may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 808. The communication manager 808 may control and/or otherwise manage one or more operations of the reception component 802 and/or the transmission component 804. In some aspects, the communication manager 808 may include one or more antennas, a modem, a controller/processor, a memory, or a combination thereof, of the UE or network entity described in connection with FIG. 2. The communication manager 808 may be, or be similar to, the communication manager 140 or 150 depicted in FIGS. 1 and 2. For example, in some aspects, the communication manager 808 may be configured to perform one or more of the functions described as being performed by the communication manager 140 or 150. In some aspects, the communication manager 808 may include the reception component 802 and/or the transmission component 804. The communication manager 808 may include an LBT component 810, a selection component 812, or a list component 814, among other examples.

In some aspects, the apparatus 800 may be configured to perform one or more operations described herein in connection with FIGS. 3-4. Additionally, or alternatively, the apparatus 800 may be configured to perform one or more processes described herein, such as process 500 of FIG. 5, process 600 of FIG. 6, process 700 of FIG. 7, or a combination thereof. In some aspects, the apparatus 800 and/or one or more components shown in FIG. 8 may include one or more components of the wireless device described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the wireless device described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the wireless device described in connection with FIG. 2. In some aspects, the transmission component 804 may be co-located with the reception component 802 in a transceiver.

In some aspects, the LBT component 810 may perform an LBT procedure for a narrowband communication that provides one or more of time and frequency synchronization or scheduling information for a UWB communication. The transmission component 804 may transmit the narrowband communication in response to the LBT procedure being successful. The transmission component 804 may transmit the UWB communication based at least in part on the one or more of time and frequency synchronization or scheduling information.

The transmission component 804 may cancel UWB communications that are associated with narrowband communications for which corresponding LBT procedures are unsuccessful due to a channel being busy. The LBT component 810 may retry the LBT procedure after a specified interval that includes at least one scheduled NB and a UWB transmission occasion. The LBT component 810 may skip a ranging round in response to a quantity of unsuccessful LBT procedures for narrowband communications that satisfies a quantity threshold.

In some aspects, the selection component 812 may select a channel from a list of channels for a narrowband communication that provides one or more of time and frequency synchronization or scheduling information for a UWB communication. The transmission component 804 may transmit the narrowband communication on the channel. The transmission component 804 may transmit the UWB communication based at least in part on the one or more of time and frequency synchronization or scheduling information.

The LBT component 810 may perform an LBT procedure for channels before transmitting the narrowband communication or the UWB communication. The list component 814 may generate the blocked list based at least in part on channel success rates for narrowband transmissions or channel scanning information. The list component 814 may exchange and respecting blocked lists with another wireless device.

The selection component 812 may select a transmission occasion for a narrowband communication that provides one or more of time and frequency synchronization or scheduling information for a UWB communication, where the transmission occasion is specified and based at least in part on a duty cycle. The transmission component 804 may transmit the narrowband communication during the transmission occasion. The transmission component 804 may transmit the UWB communication based at least in part on the one or more of time and frequency synchronization or scheduling information. The selection component 812 may negotiate one or more of the transmission occasion or the duty cycle. The LBT component 810 may perform an LBT procedure before transmitting the narrowband communication.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a wireless device, comprising: performing a listen-before-talk (LBT) procedure for a narrowband (NB) communication that provides one or more of time and frequency synchronization or scheduling information for an ultra-wideband (UWB) communication; transmitting the NB communication in response to the LBT procedure being successful; and transmitting the UWB communication based at least in part on the one or more of time and frequency synchronization or scheduling information.

Aspect 2: The method of Aspect 1, further comprising cancelling UWB communications that are associated with narrowband communications for which corresponding LBT procedures are unsuccessful due to a channel being busy.

Aspect 3: The method of Aspect 2, further comprising retrying the LBT procedure after a specified interval that includes at least one scheduled NB and a UWB transmission occasion.

Aspect 4: The method of Aspect 3, further comprising: transmitting an NB communication in response to an LBT procedure being successful; scheduling a UWB communication; and transmitting the UWB communication.

Aspect 5: The method of any of Aspects 1-4, further comprising skipping a ranging round in response to a quantity of unsuccessful LBT procedures for narrowband communications that satisfies a quantity threshold.

Aspect 6: The method of any of Aspects 1-5, wherein the UWB communication includes a UWB preamble signal.

Aspect 7: The method of any of Aspects 1-6, wherein the LBT procedure uses an energy detection threshold to determine if a channel is busy.

Aspect 8: The method of Aspect 7, wherein the energy detection threshold is at least −62 decibel milliwatts (dBm) per 20 megahertz (MHz).

Aspect 9: A method of wireless communication performed by a wireless device, comprising: selecting a channel from a list of channels for a narrowband communication that provides one or more of time and frequency synchronization or scheduling information for an ultra-wideband (UWB) communication; transmitting the narrowband communication on the channel; and transmitting the UWB communication based at least in part on the one or more of time and frequency synchronization or scheduling information.

Aspect 10: The method of Aspect 9, wherein selecting the channel includes frequency hopping from channel to channel in the list of channels.

Aspect 11: The method of Aspect 10, wherein frequency hopping includes hopping channels satisfying a minimum hopping distance.

Aspect 12: The method of any of Aspects 8-11, wherein the list of channels includes a prioritized list.

Aspect 13: The method of Aspect 12, wherein the prioritized list includes one or more of at least a subset of 5730-5735 megahertz (MHz), at least a subset of 5725-5730 MHz, at least a subset of 5835-5850 MHz, or at least a subset of 5815-5835 MHz.

Aspect 14: The method of any of Aspects 9-13, further comprising performing a listen-before-talk (LBT) procedure for channels before transmitting the narrowband communication or the UWB communication.

Aspect 15: The method of any of Aspects 9-14, further comprising applying a more stringent NB transmission duty cycle requirement for channels not in the prioritized list than for channels in the prioritized list.

Aspect 16: The method of Aspect 13, wherein an LBT energy detection threshold for a channel in the prioritized list is greater than an LBT energy detection threshold for a channel that is not in the prioritized list.

Aspect 17: The method of any of Aspects 9-11, wherein the list of channels includes a blocked list, maintained by the wireless device, and wherein selecting the channel includes avoiding channels in the blocked list.

Aspect 18: The method of Aspect 17, further comprising generating the blocked list based at least in part on channel success rates for narrowband transmissions or channel scanning information.

Aspect 19: The method of Aspect 17 or 18, further comprising exchanging blocked lists as a capability in a setup procedure and respecting blocked lists with another wireless device.

Aspect 20: A method of wireless communication performed by a wireless device, comprising: selecting a transmission occasion for a narrowband communication that provides one or more of time and frequency synchronization or scheduling information for an ultra-wideband (UWB) communication, wherein the transmission occasion is specified and based at least in part on a duty cycle; transmitting the narrowband communication during the transmission occasion; and transmitting the UWB communication based at least in part on the one or more of time and frequency synchronization or scheduling information.

Aspect 21: The method of Aspect 20, further comprising negotiating one or more of the transmission occasion or the duty cycle.

Aspect 22: The method of Aspect 20 or 21, further comprising performing a listen-before-talk (LBT) procedure before transmitting the narrowband communication.

Aspect 23: The method of any of Aspects 20-22, wherein the duty cycle is based at least in part on coexistence with another device or another radio access technology.

Aspect 24: An apparatus for wireless communication at a device, comprising a processor; memory coupled with the processor; and instructions stored in the memory and executable by the processor to cause the apparatus to perform the method of one or more of Aspects 1-23.

Aspect 25: A device for wireless communication, comprising a memory and one or more processors coupled to the memory, the one or more processors configured to perform the method of one or more of Aspects 1-23.

Aspect 26: An apparatus for wireless communication, comprising at least one means for performing the method of one or more of Aspects 1-23.

Aspect 27: A non-transitory computer-readable medium storing code for wireless communication, the code comprising instructions executable by a processor to perform the method of one or more of Aspects 1-23.

Aspect 28: A non-transitory computer-readable medium storing a set of instructions for wireless communication, the set of instructions comprising one or more instructions that, when executed by one or more processors of a device, cause the device to perform the method of one or more of Aspects 1-23.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A wireless device for wireless communication, comprising:
    a memory; and
    one or more processors, coupled to the memory, configured to:
        perform a listen-before-talk (LBT) procedure for a narrowband (NB) communication that provides one or more of time and frequency synchronization or scheduling information for an ultra-wideband (UWB) communication;
        transmit the NB communication in response to the LBT procedure being successful; and
        transmit the UWB communication based at least in part on the one or more of time and frequency synchronization or scheduling information.

2. The wireless device of claim 1, wherein the LBT procedure uses an energy detection threshold to determine if a channel is busy.

3. The wireless device of claim 2, wherein the energy detection threshold is at least −62 decibel milliwatts (dBm) per 20 megahertz (MHz).

4. The wireless device of claim 1, wherein the one or more processors are configured to cancel UWB communications that are associated with NB communications for which corresponding LBT procedures are unsuccessful due to a channel being busy.

5. The wireless device of claim 4, wherein the one or more processors are configured to retry the LBT procedure after a specified interval that includes at least one scheduled NB communication and a UWB transmission occasion.

6. The wireless device of claim 5, wherein the one or more processors are configured to:
    transmit an NB communication in response to an LBT procedure being successful;
    schedule a UWB communication; and
    transmit the UWB communication.

7. The wireless device of claim 1, wherein the one or more processors are configured to skip a ranging round in response to a quantity of unsuccessful LBT procedures for NB communications that satisfies a quantity threshold.

8. The wireless device of claim 1, wherein the UWB communication includes a UWB preamble signal.

9. A method of wireless communication performed by a wireless device, comprising:
    performing a listen-before-talk (LBT) procedure for a narrowband (NB) communication that provides one or more of time and frequency synchronization or scheduling information for an ultra-wideband (UWB) communication;
    transmitting the NB communication in response to the LBT procedure being successful; and
    transmitting the UWB communication based at least in part on the one or more of time and frequency synchronization or scheduling information.

10. The method of claim 9, wherein the LBT procedure uses an energy detection threshold to determine if a channel is busy.

11. The method of claim 10, wherein the energy detection threshold is at least equivalent to −62 decibel milliwatts (dBm) per 20 megahertz (MHz).

12. The method of claim 9, further comprising cancelling UWB communications that are associated with narrowband communications for which corresponding LBT procedures are unsuccessful due to a channel being busy.

13. The method of claim 12, further comprising retrying the LBT procedure after a specified interval that includes at least one scheduled NB communication and a UWB transmission occasion.

14. The method of claim 13, further comprising:
    transmitting an NB communication in response to an LBT procedure being successful;
    scheduling a UWB communication; and
    transmitting the UWB communication.

15. The method of claim 9, further comprising skipping a ranging round in response to a quantity of unsuccessful LBT procedures for NB communications that satisfies a quantity threshold.

16. The method of claim 9, wherein the UWB communication includes a UWB preamble signal.

17. A non-transitory computer-readable medium storing a set of instructions for wireless communication, the set of instructions comprising:
    one or more instructions that, when executed by one or more processors of a wireless device, cause the wireless device to:
        perform a listen-before-talk (LBT) procedure for a narrowband (NB) communication that provides one or more of time and frequency synchronization or scheduling information for an ultra-wideband (UWB) communication;
        transmit the NB communication in response to the LBT procedure being successful; and
        transmit the UWB communication based at least in part on the one or more of time and frequency synchronization or scheduling information.

18. The non-transitory computer-readable medium of claim 17, wherein the LBT procedure uses an energy detection threshold to determine if a channel is busy.

19. The non-transitory computer-readable medium of claim 18, wherein the energy detection threshold is at least-62 decibel milliwatts (dBm) per 20 megahertz (MHz).

20. The non-transitory computer-readable medium of claim 17, wherein the one or more instructions further cause the wireless device to cancel UWB communications that are associated with NB communications for which corresponding LBT procedures are unsuccessful due to a channel being busy.

21. The non-transitory computer-readable medium of claim 20, wherein the one or more processors are configured to retry the LBT procedure after a specified interval that includes at least one scheduled NB communication and a UWB transmission occasion.

22. The non-transitory computer-readable medium of claim 21, wherein the one or more instructions further cause the wireless device to:
transmit an NB communication in response to an LBT procedure being successful;
schedule a UWB communication; and
transmit the UWB communication.

23. The non-transitory computer-readable medium of claim 17, wherein the one or more instructions further cause the wireless device to skip a ranging round in response to a quantity of unsuccessful LBT procedures for NB communications that satisfies a quantity threshold.

24. The non-transitory computer-readable medium of claim 17, wherein the UWB communication includes a UWB preamble signal.

25. An apparatus for wireless communication, comprising:
means for performing a listen-before-talk (LBT) procedure for a narrowband (NB) communication that provides one or more of time and frequency synchronization or scheduling information for an ultra-wideband (UWB) communication;
means for transmitting the NB communication in response to the LBT procedure being successful; and
means for transmitting the UWB communication based at least in part on the one or more of time and frequency synchronization or scheduling information.

26. The apparatus of claim 25, wherein the LBT procedure uses an energy detection threshold to determine if a channel is busy.

27. The apparatus of claim 26, wherein the energy detection threshold is at least-62 decibel milliwatts (dBm) per 20 megahertz (MHz).

28. The apparatus of claim 25, further comprising means for canceling UWB communications that are associated with NB communications for which corresponding LBT procedures are unsuccessful due to a channel being busy.

29. The apparatus of claim 28, further comprising means for retrying the LBT procedure after a specified interval that includes at least one scheduled NB communication and a UWB transmission occasion.

30. The apparatus of claim 29, further comprising:
means for transmitting an NB communication in response to an LBT procedure being successful;
means for scheduling a UWB communication; and
means for transmitting the UWB communication.

\* \* \* \* \*